United States Patent
Kim et al.

(10) Patent No.: US 12,506,888 B2
(45) Date of Patent: Dec. 23, 2025

(54) IMAGE ENCODING/DECODING METHOD, DEVICE, AND COMPUTER-READABLE RECORDING MEDIUM FOR SIGNALING PURPOSE OF VCM BITSTREAM

(71) Applicant: LG ELECTRONICS INC., Seoul (KR)

(72) Inventors: Chul Keun Kim, Seoul (KR); Eunyong Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 18/022,067

(22) PCT Filed: Aug. 18, 2021

(86) PCT No.: PCT/KR2021/010966
§ 371 (c)(1),
(2) Date: Feb. 17, 2023

(87) PCT Pub. No.: WO2022/039499
PCT Pub. Date: Feb. 24, 2022

(65) Prior Publication Data
US 2023/0319297 A1    Oct. 5, 2023

(30) Foreign Application Priority Data

Aug. 18, 2020    (KR) .................. 10-2020-0103475

(51) Int. Cl.
*H04N 19/42*    (2014.01)
*H04N 19/105*    (2014.01)
(Continued)

(52) U.S. Cl.
CPC .......... *H04N 19/42* (2014.11); *H04N 19/105* (2014.11); *H04N 19/136* (2014.11); *H04N 19/46* (2014.11)

(58) Field of Classification Search
CPC .... H04N 19/42; H04N 19/105; H04N 19/136; H04N 19/46; H04N 19/70
See application file for complete search history.

(56) References Cited

U.S. PATENT DOCUMENTS

| | | | | |
|---|---|---|---|---|
| 2015/0016537 | A1* | 1/2015 | Karczewicz | H04N 19/176 375/240.18 |
| 2023/0224502 | A1* | 7/2023 | Damghanian | H04N 21/4348 375/240.26 |

FOREIGN PATENT DOCUMENTS

| | | |
|---|---|---|
| KR | 100944544 B1 | 3/2010 |
| KR | 1020140073515 A | 6/2014 |

(Continued)

OTHER PUBLICATIONS

"Coding of Moving Pictures and Audio", Use cases and draft requirements for Video Coding for Machines. ISO/IEC JTC 1/SC 29/WG 11. Apr. 24, 2020.

*Primary Examiner* — Francis Geroleo
(74) *Attorney, Agent, or Firm* — Bryan Cave Leighton Paisner LLP

(57) ABSTRACT

An image encoding/decoding method and apparatus are provided. An image decoding method performed by an image decoding apparatus according to the present disclosure is an image decoding method performed by an image decoding apparatus which reconstructs a VCM bitstream generated by video coding for machine (VCM), and may comprise the steps of determining a purpose of the VCM bitstream; and reconstructing the VCM bitstream on the basis of the determined purpose of the VCM bitstream, wherein the purpose of the VCM bitstream comprises at least one of a machine task and a human task.

7 Claims, 15 Drawing Sheets

(51) Int. Cl.
*H04N 19/136* (2014.01)
*H04N 19/46* (2014.01)

(56) References Cited

FOREIGN PATENT DOCUMENTS

KR 101789636 B1 10/2017
KR 1020190052101 A 5/2019

* cited by examiner

IMAGE ENCODING/DECODING METHOD, DEVICE, AND COMPUTER-READABLE RECORDING MEDIUM FOR SIGNALING PURPOSE OF VCM BITSTREAM

CROSS-REFERENCE TO RELATED APPLICATIONS

This application is the National Stage filing under 35 U.S.C. 371 of International Application No. PCT/KR2021/010966, filed on Aug. 18, 2021, which claims the benefit of earlier filing date and right of priority to Korean Patent Application No. 10-2020-0103475, filed on Aug. 18, 2020, the contents of which are all incorporated by reference herein in their entireties.

TECHNICAL FIELD

The present disclosure relates to an image encoding/decoding method and apparatus and, more particularly, to an image encoding/decoding method and apparatus for signaling information for distinguishing a purpose of a VCM bitstream and reconstructing a bitstream for human consumption, and a method of transmitting a bitstream generated by the image encoding method/apparatus of the present disclosure.

BACKGROUND

A VCM bitstream generated by Video Coding for Machine (VCM) may be received by a decoder and used to reconstruct an image. The reconstructed image may be used not only for human viewing but also for a machine to perform a specific task. Also, the reconstructed image may be used simultaneously by a person and a machine. However, required information may be different between a case in which a person uses an image obtained by reconstructing a VCM bitstream and a case in which a machine uses it. In addition, the characteristics of information required for image reconstruction may vary according to a specific task performed by the machine.

Therefore, it is necessary to signal for what purpose (human/machine/task, etc.) the VCM bitstream was generated. However, since conventional video codecs are designed for a single purpose (human or machine), an efficient means for signaling the purpose of a bitstream and performing an appropriate encoding/decoding method according to the purpose of the bitstream may not be provided.

SUMMARY

An object of the present disclosure is to provide an image encoding/decoding method and apparatus for signaling a purpose of a VCM bitstream.

Another object of the present disclosure is to provide an image encoding/decoding method and apparatus for encoding/decoding a VCM bitstream for human consumption.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

According to an aspect of the present disclosure, an image decoding method performed by an image decoding apparatus for reconstructing a VCM bitstream generated by video coding for machine (VCM) comprises determining a purpose of the VCM bitstream, and reconstructing the VCM bitstream based on the determined purpose of the VCM bitstream. The purpose of the VCM bitstream may comprise at least one of a machine task or a human task.

According to an aspect of the present disclosure, an image encoding method performed by an image encoding apparatus for encoding an input image of video coding for machine (VCM) may comprise determining a purpose of a VCM bitstream, and encoding the input image based on the determined purpose of the VCM bitstream. The purpose of the VCM bitstream may comprise at least one of a machine task or a human task.

A transmission method according to another aspect of the present disclosure may transmit a bitstream generated by the image encoding apparatus or the image encoding method of the present disclosure.

A computer-readable recording medium according to another aspect of the present disclosure may store a bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

According to the present disclosure, it is possible to provide an image encoding/decoding method and apparatus for signaling the purpose of a VCM bitstream.

According to the present disclosure, it is possible to provide an image encoding/decoding method and apparatus for encoding/decoding a VCM bitstream for human consumption.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DETAILED DESCRIPTION

Figure 1:
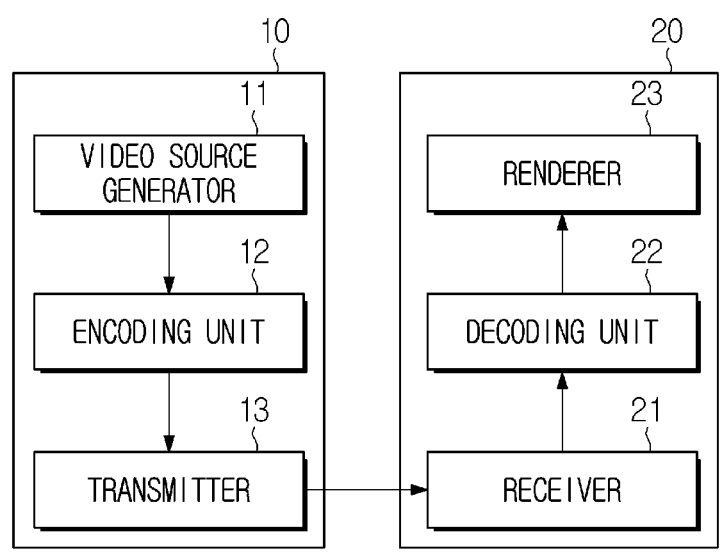
FIG. 1 is a view schematically illustrating a video coding system to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, in case it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

The present disclosure may be applied to a method disclosed in a Versatile Video Coding (VVC) standard and/or a Video Coding for Machines (VCM) standard. In addition, the present disclosure may be applied to a method disclosed in an essential video coding (EVC) standard, AOMedia Video 1 (AV1) standard, 2nd generation of audio video coding standard (AVS2), or a next-generation video/image coding standard (e.g., H.267 or H.268, etc.).

This disclosure provides various embodiments related to video/image coding, and, unless otherwise stated, the embodiments may be performed in combination with each other. In the present disclosure, "video" refers to a set of a series of images according to the passage of time. An "image" may be information generated by artificial intelligence (AI). Input information used in the process of performing a series of tasks by AI, information generated during the information processing process, and the output information may be used as images. In the present disclosure, a "picture" generally refers to a unit representing one image in a specific time period, and a slice/tile is a coding unit constituting a part of a picture in encoding. One picture may be composed of one or more slices/tiles. In addition, a slice/tile may include one or more coding tree units (CTUs). The CTU may be partitioned into one or more CUs. A tile is a rectangular region present in a specific tile row and a specific tile column in a picture, and may be composed of a plurality of CTUs. A tile column may be defined as a rectangular region of CTUs, may have the same height as a picture, and may have a width specified by a syntax element signaled from a bitstream part such as a picture parameter set. A tile row may be defined as a rectangular region of CTUs, may have the same width as a picture, and may have a height specified by a syntax element signaled from a bitstream part such as a picture parameter set. A tile scan is a certain continuous ordering method of CTUs partitioning a picture. Here, CTUs may be sequentially ordered according to a CTU raster scan within a tile, and tiles in a picture may be sequentially ordered according to a raster scan order of tiles of the picture. A slice may contain an integer number of complete tiles, or may contain a continuous integer number of complete CTU rows within one tile of one picture. A slice may be exclusively included in a single NAL unit. One picture may be composed of one or more tile groups. One tile group may include one or more tiles. A brick may indicate a rectangular region of CTU rows within a tile in a picture. One tile may include one or more bricks. The brick may refer to a rectangular region of CTU rows in a tile. One tile may be split into a plurality of bricks, and each brick may include one or more CTU rows belonging to a tile. A tile which is not split into a plurality of bricks may also be treated as a brick.

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In an embodiment, especially when applied to VCM, when there is a picture composed of a set of components having different characteristics and meanings, a pixel/pixel value may represent a pixel/pixel value of a component generated through independent information or combination, synthesis, and analysis of each component. For example, in RGB input, only the pixel/pixel value of R may be represented, only the pixel/pixel value of G may be represented, or only the pixel/pixel value of B may be represented. For example, only the pixel/pixel value of a luma component synthesized using the R, G, and B components may be represented. For example, only the pixel/pixel values of images and information extracted through analysis of R, G, and B components from components may be represented.

In the present disclosure, a "unit" may represent a basic unit of image processing. The unit may include at least one of a specific region of the picture and information related to the region. One unit may include one luma block and two chroma (e.g., Cb and Cr) blocks. The unit may be used interchangeably with terms such as "sample array", "block" or "area" in some cases. In a general case, an M×N block may include samples (or sample arrays) or a set (or array) of transform coefficients of M columns and N rows. In an embodiment, In particular, especially when applied to VCM, the unit may represent a basic unit containing information for performing a specific task.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view illustrating a video coding system according to the present disclosure.

The video coding system according to an embodiment may include a source device 10 and a reception device 20. The source device 10 may transmit encoded video and/or image information or data to the reception device 20 in the form of a file or streaming via a digital storage medium or network.

The source device 10 according to an embodiment may include a video source generator 11, an encoder 12 and a transmitter 13. The reception device 20 according to an embodiment may include a receiver 21, a decoder 22 and a renderer 23. The encoder 12 may be called a video/image encoding device, and the decoding device 22 may be called a video/image decoding device. The transmitter 13 may be included in the encoder 12. The receiver 21 may be included in the decoder 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data. In an embodiment, video/image synthesis and generation may be performed during an information processing process (AI input information, information in image processing, output information) by AI. In this case, information generated in the video/image capture process may be utilized as input information of AI.

The encoder 12 may encode an input video/image. The encoder 12 may perform a series of procedures such as prediction, transform, and quantization for compression and coding efficiency. The encoder 12 may output encoded data (encoded video/image information) in the form of a bitstream.

The transmitter 13 may transmit the encoded video/image information or data output in the form of a bitstream to the receiver 21 of the reception device 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoder 22.

The decoder 22 may decode the video/image by performing a series of procedures such as dequantization, inverse transform, and prediction corresponding to the operation of the encoder 12.

The renderer 23 may render the decoded video/image. The rendered video/image may be displayed through the display.

The decoded video may be used not only for rendering but also as input information for use in other systems. For example, the decoded video may be utilized as input information for performing AI tasks. For example, the decoded video may be utilized as input information for performing AI tasks such as face recognition, behavior recognition, and lane recognition.

Overview of Image Encoding Apparatus

Figure 2:
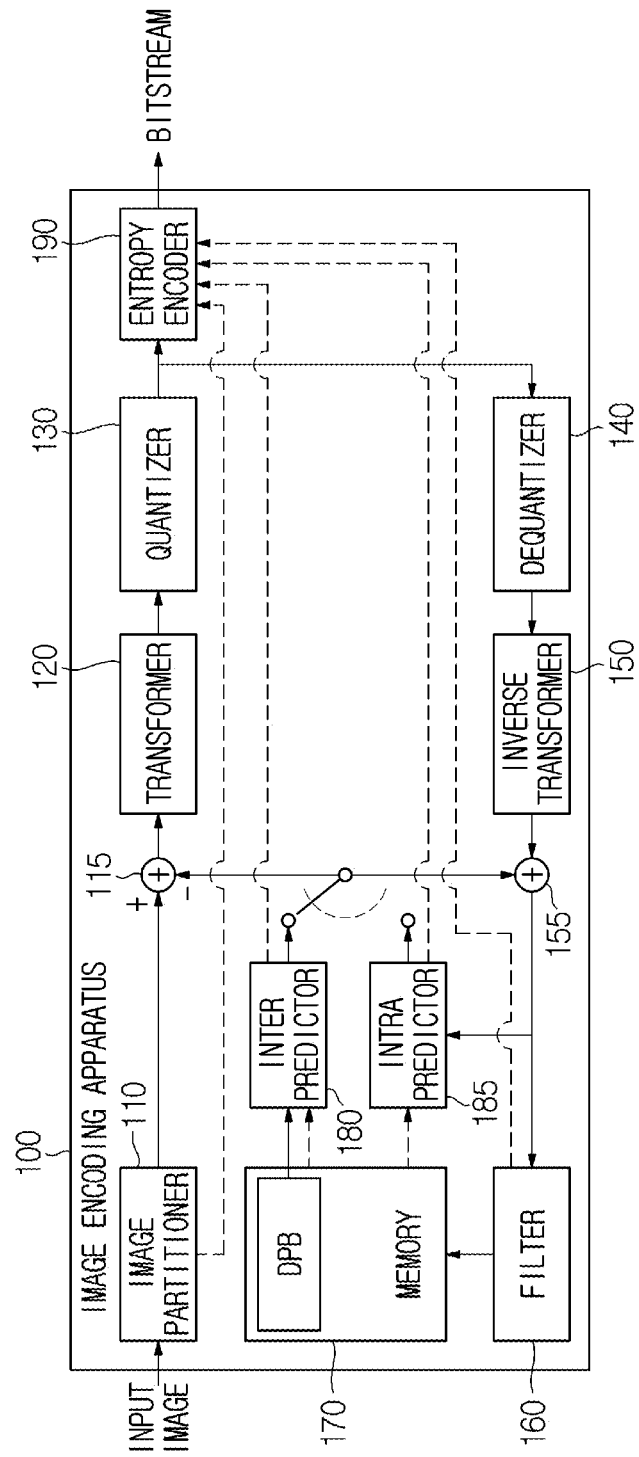
FIG. 2 is a view schematically illustrating an image encoding apparatus to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. Here, the input image may be a normal image obtained by an image sensor and/or an image generated by AI. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. In IBC, prediction is basically performed in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In addition, the video/image information may include a method of generating and using encoded information, a purpose, and the like. For example, especially when applied to VCM, the video/image information may include information indicating which AI task the encoded information is encoded for, and which network (e.g. neural network) is used to encode the encoded information, and/or information indicating for what purpose the encoded information is encoded.

Information and/or syntax elements transmitted/signaled from the encoding apparatus of the present disclosure to the decoding apparatus may be included in video/image information. The signaled information, transmitted information and/or syntax elements described in the present disclosure may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). In case there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
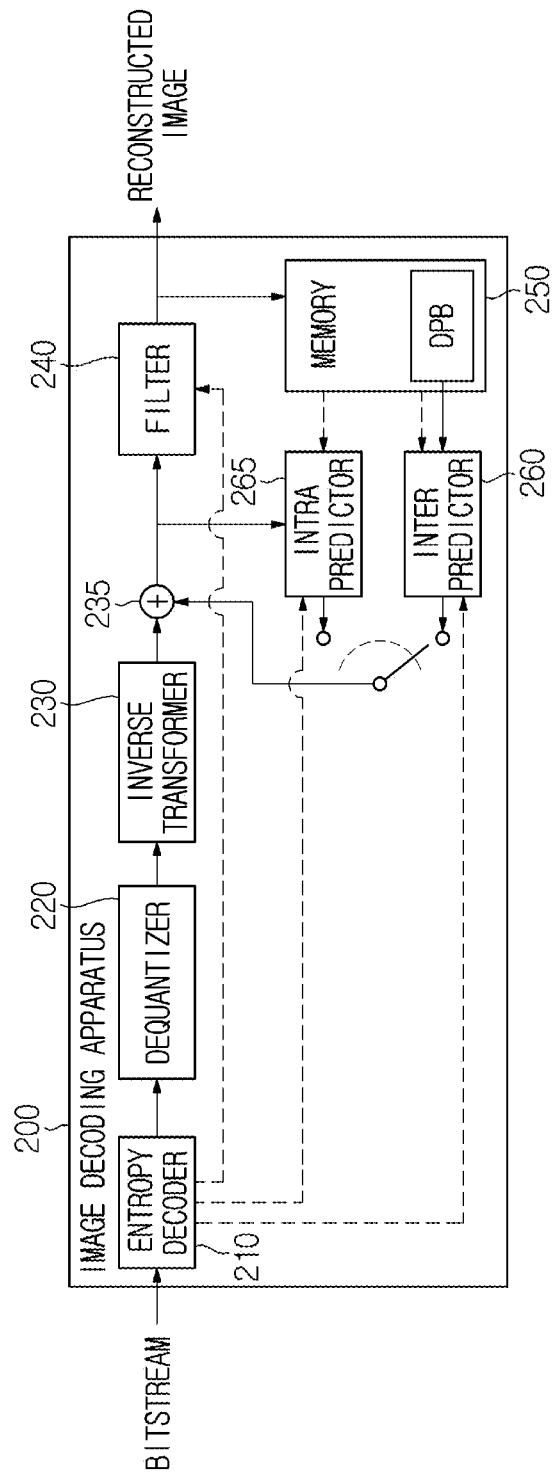
FIG. 3 is a view schematically illustrating an image decoding apparatus to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 170 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. For example, especially when applied to VCM, the video/image information may include information indicating which AI task the encoded information is encoded for, and which network (e.g. neural network) is used to encode the encoded information, and/or information indicating for what purpose the encoded information is encoded. In an embodiment, even if the corresponding image is an image having general characteristics having a general task, network, and/or use, a value thereof shall be described.

The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus.

The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). The description of the adder 155 is equally applicable to the adder 235. In case there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

General Image/Video Coding Procedure

In image/video coding, a picture configuring an image/video may be encoded/decoded according to a decoding order. A picture order corresponding to an output order of the decoded picture may be set differently from the decoding order, and, based on this, not only forward prediction but also backward prediction may be performed during inter prediction.

Figure 4:
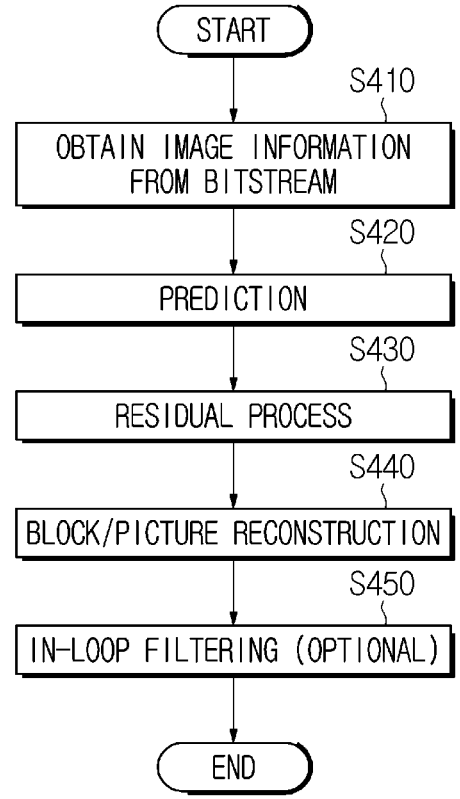
FIGS. 4 and 5 are views illustrating an example of picture decoding and encoding procedures according to an embodiment.

FIG. 4 shows an example of a schematic picture decoding procedure, to which embodiment(s) of the present disclosure is applicable. In FIG. 4, S410 may be performed in the entropy decoder 210 of the decoding apparatus described above with reference to FIG. 3, S420 may be performed in a prediction unit including the intra prediction unit 265 and the inter prediction unit 260, S430 may be performed in a residual processor including the dequantizer 220 and the inverse transformer 230, S440 may be performed in the adder 235, and S450 may be performed in the filter 240. S410 may include the information decoding procedure described in the present disclosure, S420 may include the inter/intra prediction procedure described in the present disclosure, S430 may include a residual processing procedure described in the present disclosure, S440 may include the block/picture reconstruction procedure described in the present disclosure, and S450 may include the in-loop filtering procedure described in the present disclosure.

Referring to FIG. 4, the picture decoding procedure may schematically include a procedure for obtaining image/video information (through decoding) from a bitstream (S410), a picture reconstruction procedure (S420 to S440) and an in-loop filtering procedure for a reconstructed picture (S450), as described above with reference to FIG. 3. The picture reconstruction procedure may be performed based on prediction samples and residual samples obtained through inter/intra prediction (S420) and residual processing (S430)

(dequantization and inverse transform of the quantized transform coefficient) described in the present disclosure. A modified reconstructed picture may be generated through the in-loop filtering procedure for the reconstructed picture generated through the picture reconstruction procedure, the modified reconstructed picture may be output as a decoded picture, stored in a decoded picture buffer or memory 250 of the decoding apparatus and used as a reference picture in the inter prediction procedure when decoding the picture later. In some cases, the in-loop filtering procedure may be omitted. In this case, the reconstructed picture may be output as a decoded picture, stored in a decoded picture buffer or memory 250 of the decoding apparatus, and used as a reference picture in the inter prediction procedure when decoding the picture later. The in-loop filtering procedure (S450) may include a deblocking filtering procedure, a sample adaptive offset (SAO) procedure, an adaptive loop filter (ALF) procedure and/or a bi-lateral filter procedure, as described above, some or all of which may be omitted. In addition, one or some of the deblocking filtering procedure, the sample adaptive offset (SAO) procedure, the adaptive loop filter (ALF) procedure and/or the bi-lateral filter procedure may be sequentially applied or all of them may be sequentially applied. For example, after the deblocking filtering procedure is applied to the reconstructed picture, the SAO procedure may be performed. Alternatively, for example, after the deblocking filtering procedure is applied to the reconstructed picture, the ALF procedure may be performed. This may be similarly performed even in the encoding apparatus.

Figure 5:
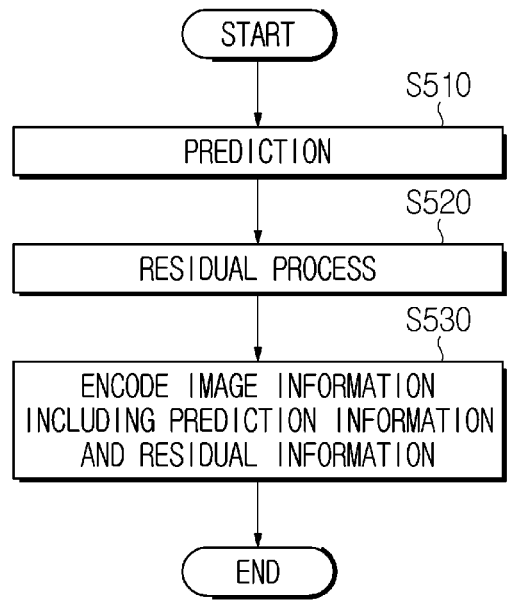

FIG. 5 shows an example of a schematic picture encoding procedure, to which embodiment(s) of the present disclosure is applicable. In FIG. 5, S510 may be performed in the prediction unit including the intra prediction unit 185 or inter prediction unit 180 of the encoding apparatus described above with reference to FIG. 2, S520 may be performed in a residual processor including the transformer 120 and/or the quantizer 130, and S530 may be performed in the entropy encoder 190. S510 may include the inter/intra prediction procedure described in the present disclosure, S520 may include the residual processing procedure described in the present disclosure, and S530 may include the information encoding procedure described in the present disclosure.

Referring to FIG. 5, the picture encoding procedure may schematically include not only a procedure for encoding and outputting information for picture reconstruction (e.g., prediction information, residual information, partitioning information, etc.) in the form of a bitstream but also a procedure for generating a reconstructed picture for a current picture and a procedure (optional) for applying in-loop filtering to a reconstructed picture, as described with respect to FIG. 2. The encoding apparatus may derive (modified) residual samples from a quantized transform coefficient through the dequantizer 140 and the inverse transformer 150, and generate the reconstructed picture based on the prediction samples, which are output of S510, and the (modified) residual samples. The reconstructed picture generated in this way may be equal to the reconstructed picture generated in the decoding apparatus. The modified reconstructed picture may be generated through the in-loop filtering procedure for the reconstructed picture, may be stored in the decoded picture buffer or memory 170, and may be used as a reference picture in the inter prediction procedure when encoding the picture later, similarly to the decoding apparatus. As described above, in some cases, some or all of the in-loop filtering procedure may be omitted. When the in-loop filtering procedure is performed, (in-loop) filtering related information (parameter) may be encoded in the entropy encoder 190 and output in the form of a bitstream, and the decoding apparatus may perform the in-loop filtering procedure using the same method as the encoding apparatus based on the filtering related information.

Through such an in-loop filtering procedure, noise occurring during image/video coding, such as blocking artifact and ringing artifact, may be reduced and subjective/objective visual quality may be improved. In addition, by performing the in-loop filtering procedure in both the encoding apparatus and the decoding apparatus, the encoding apparatus and the decoding apparatus may derive the same prediction result, picture coding reliability may be increased and the amount of data to be transmitted for picture coding may be reduced.

As described above, the picture reconstruction procedure may be performed not only in the decoding apparatus but also in the encoding apparatus. A reconstructed block may be generated based on intra prediction/inter prediction in units of blocks, and a reconstructed picture including reconstructed blocks may be generated. When a current picture/slice/tile group is an I picture/slice/tile group, blocks included in the current picture/slice/tile group may be reconstructed based on only intra prediction. Meanwhile, when the current picture/slice/tile group is a P or B picture/slice/tile group, blocks included in the current picture/slice/tile group may be reconstructed based on intra prediction or inter prediction. In this case, inter prediction may be applied to some blocks in the current picture/slice/tile group and intra prediction may be applied to the remaining blocks. The color component of the picture may include a luma component and a chroma component and the methods and embodiments of the present disclosure are applicable to the luma component and the chroma component unless explicitly limited in the present disclosure.

Overview and embodiment of video/image coding (encoding/decoding) for machines (VCM)

Hereinafter, in order to acquire and/or use necessary information from a part of a video source and/or a video source according to a request, purpose and/or surrounding environment of the user and/or machine, a method of extending and/or redesigning the above-described video/image encoding system will be described. The extended and/or redesigned video/image encoding system may be implemented as a video/image encoding apparatus and/or a video decoding apparatus for machine. Here, the machine may mean a general device, terminal, or machine.

In the following description, video coding for machines (VCM) refers to encoding/decoding by obtaining necessary information from a part of a video source and/or a video source according to a request, purpose and surrounding environment of a user and/or a machine. In this way, a part and/or information of a video source to be coded in VCM may be referred to as a feature. Also, a feature may be information extracted from a video source according to a request, purpose and surrounding environment of a user and/or a machine, and may mean a set of a series of information over time.

Figure 6:
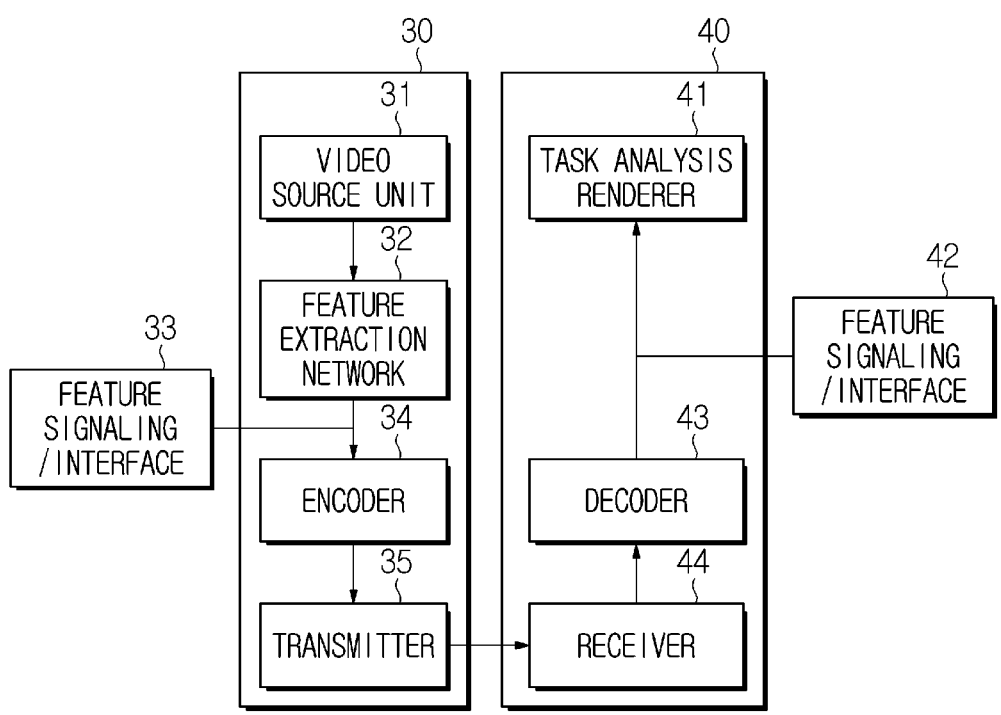
FIG. 6 is a diagram illustrating an embodiment of a video/image encoding apparatus and/or a video decoding apparatus for machines.

FIG. 6 is a diagram illustrating an embodiment of a video/image encoding apparatus and/or a video decoding apparatus for machines. Referring to FIG. 6, the VCM system may include a source device 30 and a reception device 40. The source device 30 may transmit encoded feature information to the reception device 40 through a storage medium or a network. The source device 30 and the reception device 40 may be used by humans and/or machines, respectively.

The video source unit 31 may acquire a video/image through a process of capturing, synthesizing, or generating a video/image. The video source unit 31 may include a video/image capture device and/or a video/image generating device.

A feature extraction network 32 may obtain a feature from the video/image obtained from the video source unit 31. The feature extraction network 32 may include a video/image capture device and/or a video/image generation device. The feature may be information extracted/processed by the video source unit 31 according to a user and/or machine's request, a purpose, and a surrounding environment, and may mean a set of a series of information according to the passage of time.

In FIG. 6, a feature signaling information/interface 33 in the source device 30 refers to information signaled between the feature extraction network 32 and an encoder 34 and/or an interface between the feature extraction network 32 and the encoder 34. In addition, in FIG. 6, the feature signaling/interface 42 in the reception device 40 refers to information signaled between a decoder 43 and a task analysis/renderer 41 and/or an interface between the decoder 43 and the task analysis/renderer 41. The feature signaling information/interfaces 33 and 42 may include information on the feature such as type, acquisition method, purpose, etc. of the feature acquired through the feature extraction network 32, and may include information on requesting necessary information/operation from the feature extraction network 32.

The encoder 34 may perform a series of procedures such as prediction, transform, and quantization for feature compression and coding efficiency. Encoded data (encoded feature information) may be output in the form of a bitstream.

A transmitter 35 may transmit an encoded feature output in the form of a bitstream to the receiver of the reception device 40. For example, the encoded information may be transmitted through a wired/wireless network or stored and transmitted in a storage medium. The transmitter 35 may include an element for generating a media file through a predetermined file format. In an embodiment, the storage medium may include various digital storage media such as USB, SD, CD, DVD, Blu-ray, HDD, SSD, and the like.

In addition, the transmitter 35 may transmit the bitstream including the encoded feature to the receiver of the reception device through a transmission network. To this end, the transmitter 35 may include an element for transmission through a broadcast/communication network.

A receiver 44 of the reception device 40 may receive the bitstream including the feature information, extract feature information therefrom and transmit it to the decoder 43.

The decoder 43 may decode a video/image by performing a series of procedures such as dequantization, inverse transformation, and prediction corresponding to operation of the encoder 34.

The task analysis/renderer 41 may render the feature decoded in the decoder 43. In addition, the task analysis/renderer 41 may perform a task of a user or a machine using the decoded feature. Examples of tasks may include AI such as face recognition, behavior recognition and lane recognition, computer vision tasks, and the like.

The present disclosure provides various embodiments related to feature acquisition and coding, and, unless otherwise noted, the embodiments may be combined with each other. For example, the VCM technology disclosed in the present disclosure may be utilized in a monitoring system. For example, VCM technology may be applied to perform tasks such as recognizing and tracking an object/person. VCM may also be used for the purpose of transmitting or storing information obtained from surveillance cameras.

Alternatively, VCM may be utilized in the field of intelligent transportation. Each vehicle constituting a smart traffic system may collect location information collected from a GPS, sensor information necessary for autonomous driving and safety, such as cameras, LIDAR, radar, and ultrasonic sensors, and various vehicle control information. (brakes, wipers, headlights, etc.) and transmit them to other vehicles or infrastructure. An original image or processed image signal collected from various sensors may be compressed with VCM and transmitted, and, in this case, 5G data network may be used for data transmission.

Alternatively, VCM may be utilized in the smart city field. In a smart city system, interconnected node sensors and devices may transmit information necessary to perform their respective tasks using VCM technology. Examples of the tasks of the smart city may include monitoring traffic conditions, measuring and predicting density, predicting traffic flows and allocating resources. In addition, the method/embodiment disclosed in the present disclosure may be applied to a method disclosed in a Video Coding for Machines (VCM) standard.

The following embodiments may correspond to a description of a method of signaling a purpose of a VCM bitstream. In addition, when the purpose of the VCM bitstream is human consumption, it may correspond to a description of a method of encoding/decoding input data. The purpose of VCM may be a machine task and human consumption. Accordingly, it is necessary to determine whether an encoded VCM bitstream is related to human consumption or a machine task. In addition, it is necessary to define a method of encoding/decoding image data for human consumption. When the VCM bitstream is for human consumption, a decoded image data may be provided to human. In the present disclosure, when a VCM bitstream is for human consumption, the corresponding VCM bitstream may be referred to as human consumption or a human task.

Figure 7:
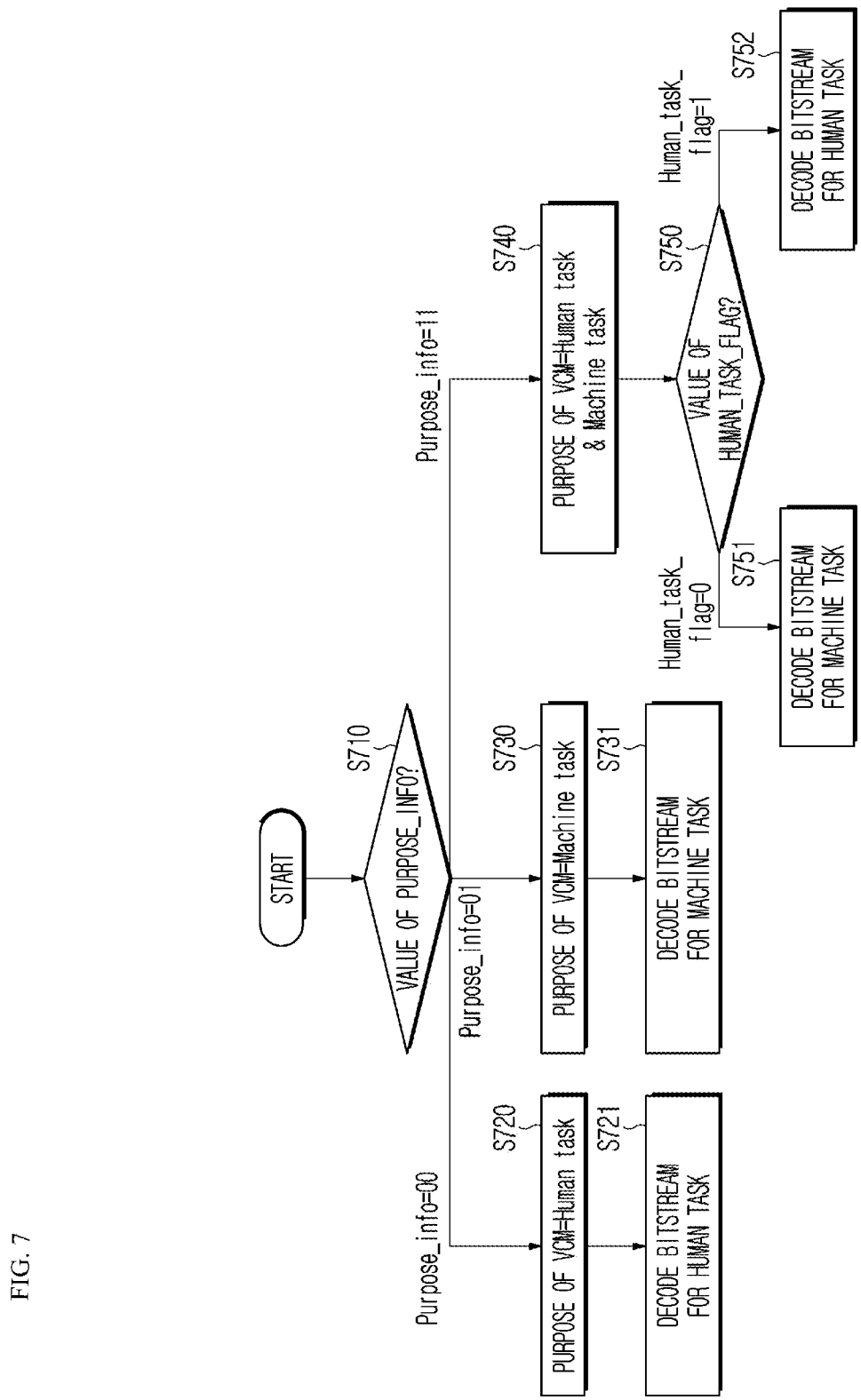
FIG. 7 is a flowchart for explaining a decoding process based on information for distinguishing the purpose of a bitstream according to an embodiment of the present disclosure.

FIG. 7 is a flowchart for explaining a decoding process based on information for distinguishing the purpose of a bitstream according to an embodiment of the present disclosure. The purpose of the VCM may correspond to the same purpose within one sequence or specific unit. In this case, it is not necessary to encode information indicating the purpose of the VCM for each sequence. For example, information indicating the purpose of the VCM may be signaled in a predetermined unit or signaled only under specific conditions. Alternatively, information indicating the purpose of the VCM may be signaled only once. In addition, information indicating the purpose of the VCM may be hierarchically configured. When the purpose of the VCM is both a machine task and human consumption during a specific unit, it is necessary to specify what purpose each bitstream is used for.

If the purpose of the VCM during a specific unit is only a machine task, since a VCM bitstream for the machine task is generated, the purpose of the corresponding bitstream does not need to be specified. Similarly, if the purpose of the VCM during a specific unit is only a human task, since a VCM bitstream for the human task is generated, the purpose of the corresponding bitstream does not need to be specified. For example, when the purpose of the VCM during a specific unit is not fixed, information (e.g., Purpose_info) indicating the purpose of the corresponding VCM may be signaled. Purpose_info having a value of '00' may indicate that the purpose of the VCM is a machine task. Purpose_info having a value of '01' may indicate that the purpose of VCM is a human task. Purpose_info having a value of '11' may indicate that the purpose of the VCM is a machine task and a human task. In the above example, when Purpose_info is '00' or '01', since the purpose of the corresponding VCM is fixed, information indicating the purpose of the VCM bitstream may not be signaled as described above. However, when Purpose_info is '11', it is necessary to signal whether the VCM bitstream is a machine task or a human task. A method of signaling whether the VCM bitstream is for a machine task or a human task will be described later. The Purpose_info is an example of information indicating the purpose of the VCM. The above-described specific values and their corresponding meanings are only examples, and are not limited thereto.

As another example, information (e.g., Purpose_info_flag) indicating whether information indicating the purpose of the VCM bitstream is signaled may be signaled. Purpose_info_flag of a first value (e.g., 1) may indicate that information indicating the purpose of the VCM bitstream is signaled. In this case, the purpose of the VCM may correspond to a machine task and a human task. Purpose_info_flag of a second value (e.g., 0) may indicate that information indicating the purpose of the VCM bitstream is not signaled. In this case, the purpose of the VCM may be a machine task or only a human task. The Purpose_info_flag is an example of information indicating whether information indicating the purpose of the VCM bitstream is signaled. Accordingly, the above-described specific values and their corresponding meanings are only examples, and are not limited thereto.

Information indicating the purpose of the VCM bitstream may be independently signaled. Alternatively, in consideration of encoding efficiency, information indicating the purpose of the VCM bitstream may be hierarchically used with Purpose_info and/or Purpose_info_flag.

Specifically, when Purpose_info has a value of '11' or Purpose_info_flag has a first value (e.g., 1), information indicating the purpose of the VCM bitstream may be signaled. As information indicating the purpose of the VCM bitstream, for example, information (e.g., Machine_task_flag) indicating whether the purpose of the bitstream is a machine task may be signaled. Machine_task_flag of a first value (e.g., 1) may indicate that the purpose of the bitstream is a machine task. Machine_fask_flag of a second value (e.g., 0) may indicate that the purpose of the bitstream is not a machine task. As another example, information (e.g., Human_task_flag) indicating whether the purpose of the bitstream is a human task may be signaled. Human_task_flag of a first value (e.g., 1) may indicate that the purpose of the bitstream is a human task. Human_task_flag of a second value (e.g., 0) may indicate that the purpose of the bitstream is not a human task. When the purpose of the VCM bitstream includes only two purposes, a machine task and a human task, since Machine_task_flag and Human_task_flag have mutually exclusive meanings, only one of the two flags may be signaled.

FIG. 7 is a diagram for explaining a method of decoding a purpose of a bitstream according to an embodiment of the present disclosure.

Referring to FIG. 7, an image decoding apparatus, which has received a VCM bitstream, may obtain a value of Purpose_info from the bitstream (S710). If the value of purpose_info is '00', the image decoding apparatus may identify that the purpose of the VCM is a human task (S720). In addition, the image decoding apparatus may decode the VCM bitstream for the human task (S721).

When the value of Purpose_info is '01', the image decoding apparatus may identify that the purpose of the VCM is a machine task (S730). In addition, the image decoding apparatus may decode the VCM bitstream for the machine task (S731).

If the value of Purpose_info is '11', the image decoding apparatus may identify that the purpose of the VCM is a machine task and a human task (S740). Then, the image decoding apparatus may obtain a value of Human_task_flag from the bitstream (S750). When the value of Human_task_flag is a second value (e.g., 0), the image decoding apparatus may decode the VCM bitstream for the machine task (S751). When the value of Human_task_flag is a first value (e.g., 1), the image decoding apparatus may decode the VCM bitstream for the human task (S752).

In the embodiment described with reference to FIG. 7, Machine_task_flag may be signaled instead of Human_task_flag. In this case, when the value of Machine_Task_Flag is a second value (e.g., 0), the image decoding apparatus may decode the VCM bitstream for the human task, and when the value of Machine_Task_Flag is a first value (e.g., 1), the image decoding apparatus may decode the VCM bitstream for the machine task.

The process described with reference to FIG. 7 is exemplary, and the method of signaling the purpose of the bitstream according to the present disclosure is not limited to the example shown in FIG. 7. For example, some of the steps shown in FIG. 7 may be omitted, and steps other than the steps shown in FIG. 7 may be added to an arbitrary position on the flowchart of FIG. 7. In addition, some of the steps shown in FIG. 7 may be performed simultaneously with other steps or the order of other steps may be changed. For example, steps S720, S730 and/or step S740 of FIG. 7 may not be essential steps for decoding the purpose of the bitstream, and thus may be omitted.

Figure 8:
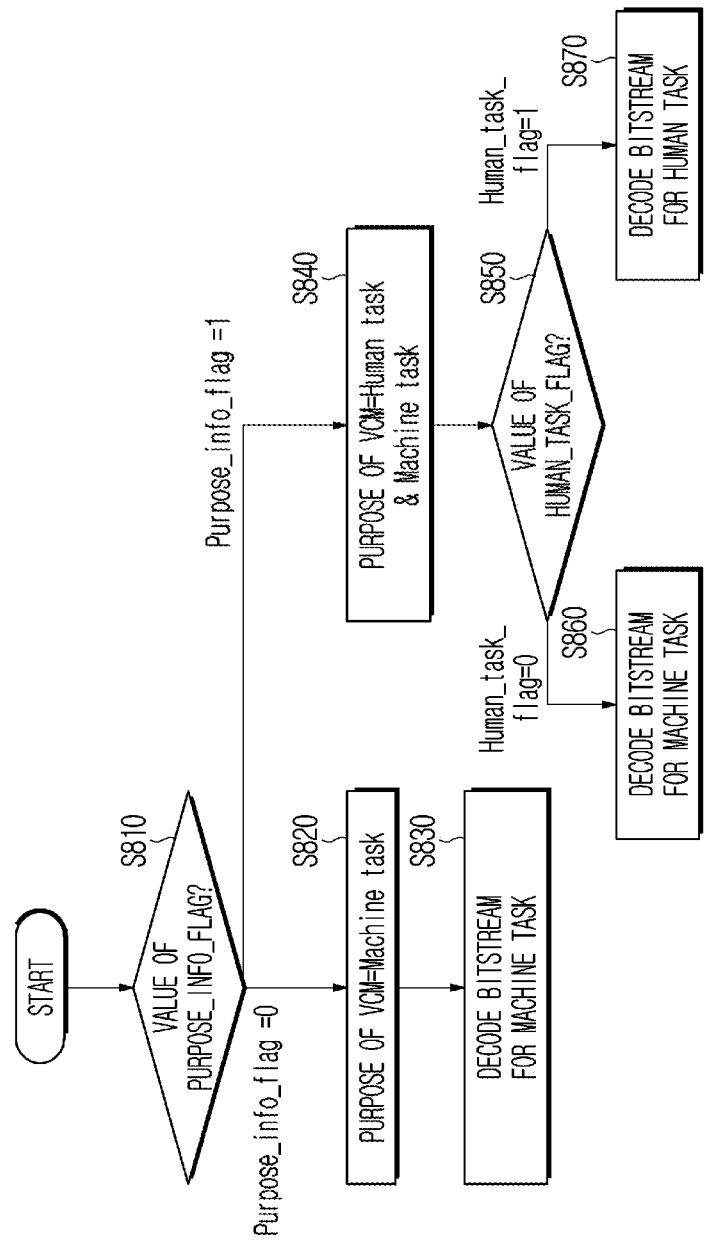
FIG. 8 is a flowchart for explaining a decoding process based on information for distinguishing the purpose of a bitstream according to another embodiment of the present disclosure.

FIG. 8 is a diagram for explaining a method of decoding a purpose of a bitstream according to another embodiment of the present disclosure.

Referring to FIG. 8, an image decoding apparatus, which has received a VCM bitstream, may obtain a value of Purpose_info_flag from the bitstream (S810). When the value of Purpose_info_flag is a second value (e.g., 0), the image decoding apparatus may determine that information indicating the purpose of the VCM bitstream is not signaled. In this case, the image decoding apparatus may identify that the purpose of the VCM bitstream is a predetermined purpose. For example, the predetermined purpose may be a machine task (S820). In addition, the image decoding apparatus may decode the VCM bitstream for the machine task (S830). As another example, the predetermined purpose may be a human task, and in this case, the image decoding apparatus may decode a VCM bitstream for a human task.

When the value of Purpose_info_flag is a first value (e.g., 1), the image decoding apparatus may determine that information indicating the purpose of the VCM bitstream is signaled. In this case, the image decoding apparatus may identify that the purpose of the VCM is a machine task and a human task (S840). In addition, the image decoding apparatus may obtain a value of Human_task_flag from the bitstream (S850). When the value of Human_task_flag is a second value (e.g., 0), the image decoding apparatus may decode the bitstream for the machine task. (S860). When the value of Human_task_flag is a first value (e.g., 1), the image decoding apparatus may decode the bitstream for the human task (S870). Here, Machine_Task_Flag may be used instead of Human_task_flag as described above.

The process described with reference to FIG. 8 is exemplary, and the method of signaling the purpose of the bitstream according to the present disclosure is not limited to the example shown in FIG. 8. For example, some of the steps shown in FIG. 8 may be omitted, and steps other than the steps shown in FIG. 8 may be added to an arbitrary position on the flowchart of FIG. 8. In addition, some of the steps shown in FIG. 8 may be performed simultaneously with other steps or the order of other steps may be changed. For example, steps S820 and/or step S840 of FIG. 8 may not be essential steps for decoding the purpose of the bitstream, and thus may be omitted.

Figure 9:
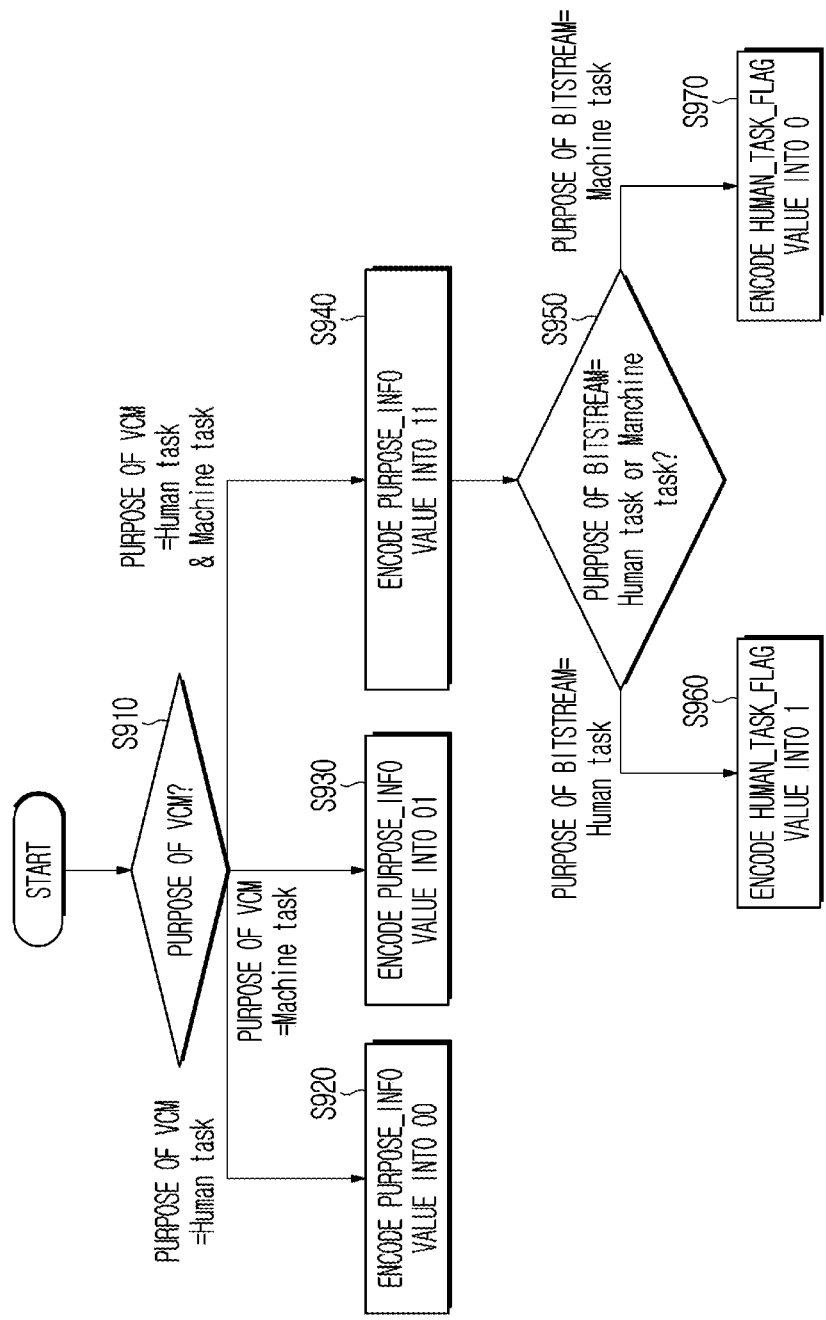
FIG. 9 is a flowchart for explaining an encoding process of information for distinguishing the purpose of a bitstream according to another embodiment of the present disclosure.

FIG. 9 is a diagram for explaining a process of encoding a purpose of a bitstream according to an embodiment of the present disclosure.

Referring to FIG. 9, an image encoding apparatus may determine a purpose of VCM for generating a bitstream (S910). If the purpose of the VCM is a human task, the image encoding apparatus may encode the value of Purpose_info into '00' (S920). If the purpose of the VCM is a machine task, the image encoding apparatus may encode the value of Purpose_info into '01' (S930).

When the purpose of the VCM is a machine task and a human task, the image encoding apparatus may encode the value of Purpose_info into '11' (S930). In addition, the image encoding apparatus may determine whether the purpose of the bitstream generated by the VCM is a human task or a machine task (S950). When the purpose of the VCM bitstream is a human task, the image encoding apparatus may encode the value of Human_task_flag into a first value (e.g., 1) (S960). Here, the image encoding apparatus may encode the value of Machine_task_flag into a second value (e.g., 0), instead of Human_task_flag. When the purpose of the VCM bitstream is a machine task, the image encoding apparatus may encode the value of Human_task_flag into a second value (e.g., 0) (S970). Here, the image encoding apparatus may encode the value of Machine_task_flag into a first value (e.g., 1), instead of Human_task_flag.

In the example described with reference to FIG. 9, Purpose_info and/or Human_task_flag (or Machine_task_flag) may be included in the VCM bitstream and transmitted to an image decoding apparatus.

As a process of encoding the purpose of the bitstream according to another embodiment of the present disclosure, the image encoding apparatus may determine whether the purpose of the VCM bitstream is signaled. When the purpose of the VCM bitstream is signaled, the image encoding apparatus may encode information indicating that the purpose of the VCM bitstream is signaled. When the purpose of the VCM bitstream is not signaled, the image encoding apparatus may encode information indicating that the purpose of the VCM bitstream is not signaled. For example, when the purpose of the VCM is a human task, the image encoding apparatus may encode the value of information (e.g., Purpose_info_Flag) indicating whether the purpose of the VCM bitstream is signaled into 0. Similarly, when the purpose of the VCM is a machine task, the image encoding apparatus may encode the value of Purpose_info_Flag into 0. For example, when the purpose of the VCM is a machine task and a human task, the image encoding apparatus may encode the value of Purpose_info_Flag into 1. When the purpose of the VCM bitstream is signaled, the image encoding apparatus may encode information (e.g., Human_task_flag and/or Machine_task_flag) indicating the purpose of the VCM bitstream.

The encoding process of the purpose of the bitstream described with reference to FIG. 9 is exemplary, and the encoding process of the purpose of the bitstream according to the present disclosure is not limited to the example shown in FIG. 9. For example, some of the steps shown in FIG. 9 may be omitted, and steps other than the steps shown in FIG. 9 may be added to an arbitrary position on the flowchart of FIG. 9. In addition, some of the steps shown in FIG. 9 may be performed simultaneously with other steps or the order of other steps may be changed.

Figure 10:
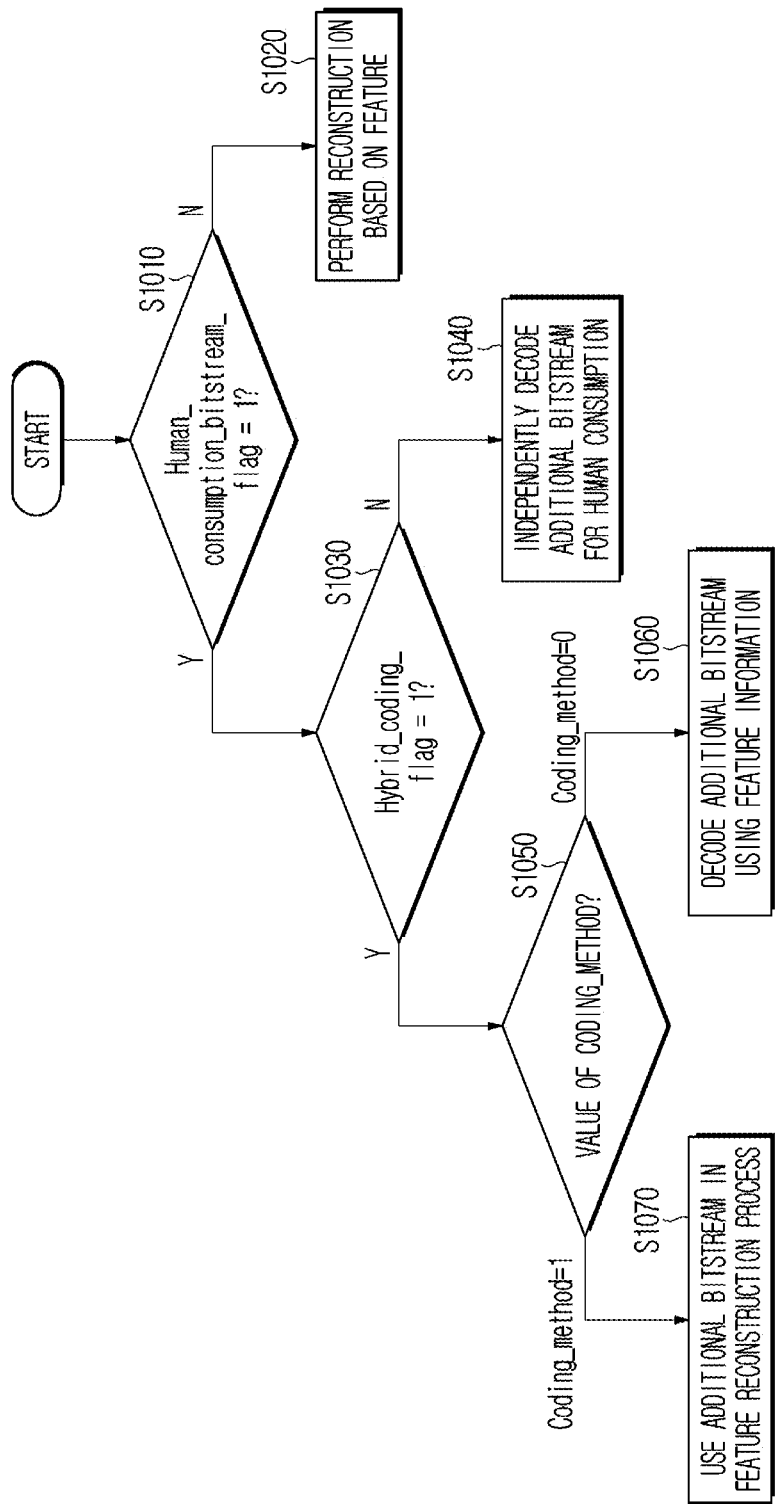
FIG. 10 is a flowchart illustrating a process of decoding a video coding for machine (VCM) bitstream for human consumption according to an embodiment of the present disclosure.

FIG. 10 is a flowchart illustrating a process of decoding a video coding for machine (VCM) bitstream for human consumption according to an embodiment of the present disclosure. When the purpose of the VCM bitstream is human consumption, the decoding method of the VCM bitstream may be divided into a method of using an additional bitstream and a method of not using an additional bitstream. To this end, when decoding the VCM bitstream, information (e.g., Human_consumption_bitstream_flag) indicating whether to use the additional bitstream may be signaled. Human_consumption_bitstream_flag of a first value (e.g., 1) may indicate that the additional bitstream is used to decode the VCM bitstream. Human_consumption_bitstream_flag of a second value (e.g., 0) may indicate that the additional bitstream is not used to decode the VCM bitstream.

When the additional bitstream is used, there may be a method of using both a feature and an additional bitstream and a method of using only an additional bitstream. In order to distinguish between them, information (e.g., Hybrid_coding_flag) indicating whether both the feature and the additional bitstream are used may be signaled. Hybrid_coding_flag of a first value (e.g., 1) may indicate that both the feature and the additional bitstream are used, for example, are organically combined and used. Hybrid_coding_flag of a second value (e.g., 0) may indicate that only the additional bitstream is used.

When both the additional bitstream and the feature are used, one of a method (first method) of decoding an additional bitstream using feature information and a method (second method) of improving quality of an image decoded through a feature using an additional bitstream may be used. Accordingly, information (e.g., Coding_method) indicating one of a plurality of methods of decoding an image using the additional bitstream may be signaled. Coding_method of a first value (e.g., 1) may indicate the method (second method) of improving the quality of the image decoded through the feature using the additional bitstream. coding_method of a second value (e.g., 0) may indicate that the method (first method) of decoding the additional bitstream using the feature information is used. Coding_method may correspond to 1-bit information. However, it is not limited thereto, and, when there are two or more methods of using both the additional bitstream and the feature, more bits may be assigned to Coding_method.

Referring to FIG. 10, the image decoding apparatus may determine whether Human_consumption_bitstream_flag is a first value (e.g., 1) (S1010). When Human_consumption_bitstream_flag is a second value (e.g., 0) (S1010—NO), the image decoding apparatus may reconstruct an input image based on a feature without using the additional bitstream (S1020). When Human_consumption_bitstream_flag is a first value (e.g., 1) (S1010—YES), the image decoding apparatus may determine whether Hybrid_coding_flag is a first value (e.g., 1) (S1030). When Hybrid_coding_flag is a second value (e.g., 0) (S1030—NO), the image decoding apparatus may reconstruct an image for human consumption by independently decoding only the additional bitstream (S1040). In this case, a method used for independent decoding may be recoded in a header of VCM or a header of an additional bitstream. For example, information on a video compression codec used to encode the additional bitstream may be recorded in a header of VCM or a header of an additional bitstream. When Hybrid_coding_flag is a first value (e.g., 1) (S1030—YES), the image decoding apparatus may determine a value of Coding_method (S1050). When Coding_method is a second value (e.g., 0), the image decoding apparatus may perform the first method of decoding the additional bitstream using the feature information (S1060). When Coding_method is a first value (e.g., 1), the image decoding apparatus may perform the second method of using the additional bitstream in a feature reconstruction process (S1070).

The process described with reference to FIG. 10 is exemplary, and the decoding process of the VCM bitstream for human consumption according to the present disclosure is not limited to the example shown in FIG. 10. For example, some of the steps shown in FIG. 10 may be omitted, and steps other than the steps shown in FIG. 10 may be added to an arbitrary position on the flowchart of FIG. 10. In addition, some of the steps shown in FIG. 10 may be performed simultaneously with other steps or the order of other steps may be changed.

Figure 11:
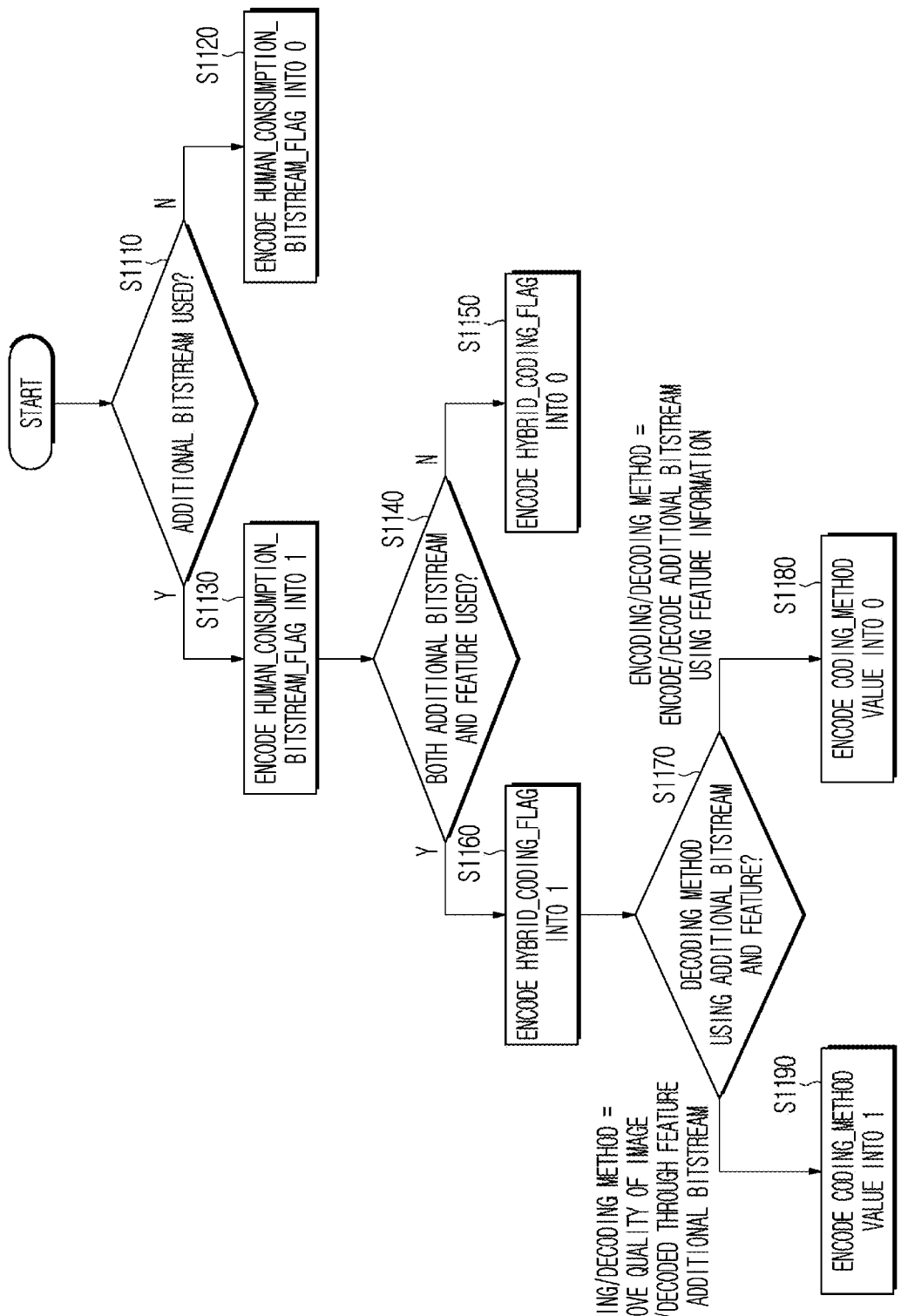
FIG. 11 is a flowchart illustrating a process of encoding image data of video coding for machine (VCM) for human consumption according to an embodiment of the present disclosure.

FIG. 11 is a diagram illustrating a process of encoding a video coding for machine (VCM) bitstream for human consumption according to an embodiment of the present disclosure.

Referring to FIG. 11, the image encoding apparatus may determine whether an additional bitstream is used to encode/decode an input image (S1110). When the additional bitstream is not used (S1110—NO), the image encoding apparatus may encode the value of Human_consumption_bitstream_flag into a second value (e.g., 0) (S1120). When the additional bitstream is used (S1110—YES), the image encoding apparatus may encode the value of Human_consumption_bitstream_flag into a first value (e.g., 1) (S1130). In addition, the image encoding apparatus may determine whether both the additional bitstream and the feature are used to encode/decode the input image (S1140). When both the additional bitstream and the feature are not used and only the additional bitstream is used (S1140—NO), the image encoding apparatus may encode the value of Hybrid_coding_flag into a second value (e.g., 0) (S1150). In this case, a method used for independent encoding of the input image may be recorded in a header of VCM or a header of the additional bitstream. In addition, the information may be encoded through Coding_method and recorded in the additional bitstream. For example, information on a video compression codec used to encode the additional bitstream may be recorded in a header of VCM or a header of the additional bitstream. When both the additional bitstream and the feature are used (S1140—YES), the image encoding apparatus may encode the value of Hybrid_coding_flag into a first value (e.g., 1) (S1160). In addition, the image encoding apparatus may determine the encoding/decoding method of the input image using the additional bitstream and the feature (S1170). When the additional bitstream is encoded/decoded using the feature information in the encoding/decoding method of the input image (first method), the image encoding apparatus may encode the value of Coding_method into a second value (e.g., 0) (S1180). When the quality of the image encoded/decoded through the feature is improved using the additional bitstream in the encoding/decoding method of the input image (second method), the image encoding apparatus may encode the value of Coding_method into a first value (e.g., 1) (S1190).

The process described with reference to FIG. 11 is exemplary, and the process of encoding the VCM bitstream for human consumption according to an embodiment of the present disclosure is not limited to the example shown in FIG. 11. For example, some of the steps shown in FIG. 11 may be omitted, and steps other than the steps shown in FIG. 11 may be added to an arbitrary position on the flowchart of FIG. 11. In addition, some of the steps shown in FIG. 11 may be performed simultaneously with other steps or the order of other steps may be changed.

Figure 12:
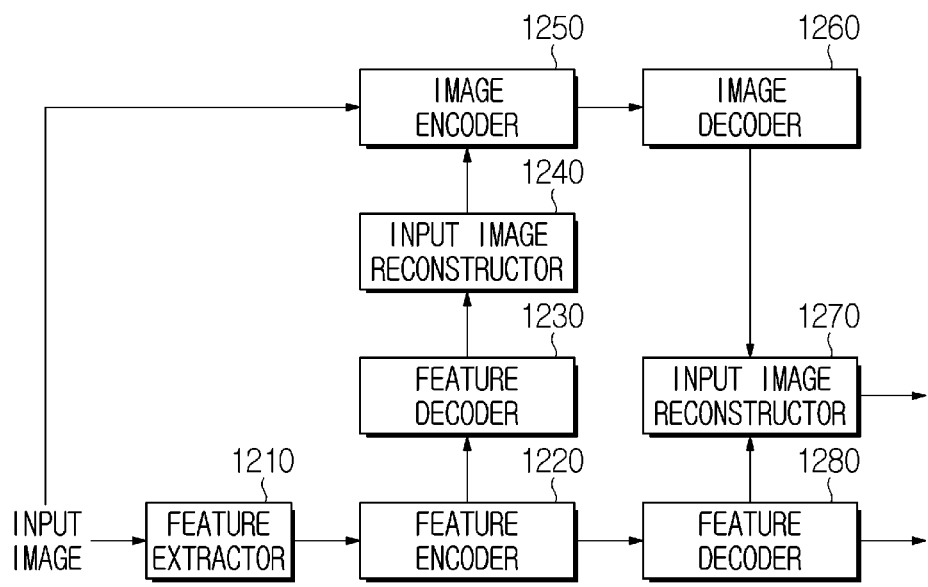
FIG. 12 is a block diagram illustrating encoding/decoding of an input image based on an additional bitstream and a feature according to an embodiment of the present disclosure.

FIG. 12 is a block diagram illustrating encoding/decoding of an input image based on an additional bitstream and a feature according to an embodiment of the present disclosure. The block diagram of FIG. 12 may be a block diagram of an apparatus for performing the first method. As an example of a first method of encoding/decoding an additional bitstream using feature information, there may be a method of differentially encoding/decoding a background area and a non-background area. For example, a background area and a non-background area may be distinguished using the feature information and, based on this, the additional bitstream may be differentially encoded/decoded. As a second method, there may be a method of encoding/decoding an area necessary for human consumption. For example, the area necessary for human consumption may be identified using feature information and, based on this, the additional bitstream may be encoded/decoded. As a third method, there may be a method of combining an image encoded/decoded into an additional bitstream and an image encoded/decoded using feature information.

Referring to FIG. 12, a feature extractor 1210 may receive an input image and extract a feature from the input image. In addition, the extracted feature may be sent to a feature encoder 1220. The feature encoder 1220 may encode the received feature and send the encoded feature to a feature decoder 1230. The feature decoder 1230 may decode the encoded feature. In addition, the decoded feature may be sent to an input image reconstructor 1240. The input image reconstructor 1240 may reconstruct the input image using the decoded feature. As an example, in the case of using a feature of a bottleneck layer of an autoencoder, reconstructing to an original dimension may correspond to this. The input image reconstructor 1240 may send the input image reconstructed based on the feature to the image encoder 1250.

The image encoder 1250 may encode the input image into an additional bitstream using the input image reconstructed based on the decoded feature and an actual input image. For example, the image encoder 1250 may encode only a difference value between the input image reconstructed based on the decoded feature and the actual input image. For example, the image encoder 1250 may store and use the input image reconstructed based on the decoded feature as one of reference frames.

According to the first method, the feature information may be used to decode the additional bitstream. At this time, additional information may be required for efficient use of the feature information. For example, the encoding period of the feature may not be fixed unlike an image for human consumption. Alternatively, the encoding period of the feature may be different from the period of an image for human consumption. Therefore, information capable of knowing a temporal relationship between a feature and an image for human consumption may be required. In relation to the temporal relationship between the feature and the image for human consumption, information (e.g., Feature_picture_order_count) indicating a frame number of a picture used to extract a feature may be signaled. Alternatively, information (e.g., Feature_reference_flag) indicating whether the input image has been encoded using the feature may be signaled. Feature_reference_flag of a first value (e.g., 1) may indicate that the input image has been encoded using the feature. Alternatively, Feature_reference_flag of a first value (e.g., 1) may indicate that the input image has been decoded using the feature. Feature_reference_flag of a second value (e.g., 0) may indicate that the feature is not used to encode the input image. Alternatively, Feature_reference_flag of a second value (e.g., 0) may indicate that the feature is not used to decode the input image. When the feature is used to decode the input image, information (e.g., Feature_refernece_order) indicating the frame number of the used feature may be signaled. The image encoder 1250 may use a feature with a smallest temporal difference between Feature_picture_order_count and a picture to be encoded (input image) as a reference picture of the picture to be encoded. In addition, the image encoder 1250 may perform encoding without using the reference feature, when the temporal difference is greater than a predetermined threshold. Alternatively, the image encoder 1250 may determine whether to use a reference feature for the input image based on rate distortion optimization (RD0). Upon determining that the reference picture is not used to encode the input image, for example, Feature_reference_flag may be encoded into a second value (e.g., 0).

The image decoder 1260 may receive the encoded additional bitstream from the image encoder 1250. The image decoder 1260 may decode the encoded additional bitstream and send the decoded input image to the input image reconstructor 1270. The feature decoder 1280 may receive the bitstream with the encoded feature from the feature encoder 1220 and decode the bitstream with the encoded feature. The input image reconstructor 1270 may reconstruct the input image based on the decoded input image received from the image decoder 1260 and the decoded feature received from the feature decoder 1280. Since the input image reconstructor 1270 reconstructs an image based on the decoded feature and the input image reconstructed from the additional bitstream, the quality of the input image reconstructed by the input image reconstructor 1270 may be improved compared to the quality of the input image reconstructed by the input image reconstructor 1240.

In the example shown in FIG. 12, the feature extractor 1210, the feature encoder 1220, the feature decoder 1230, the input image reconstructor 1240, and the image encoder 1250 may configure an image encoding apparatus for generating a VCM bitstream. Also, the image decoder 1260, the input image reconstructor 1270, and the feature decoder 1280 may configure an image decoding apparatus for reconstructing a VCM bitstream.

Figure 13:
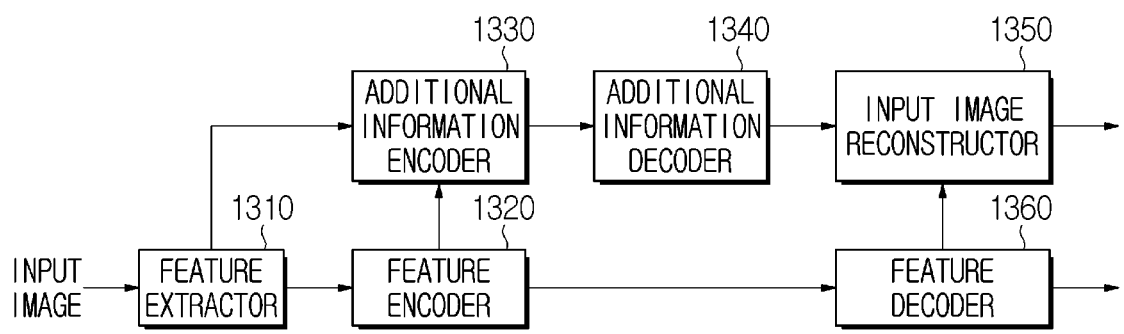
FIG. 13 is a block diagram illustrating encoding/decoding of an input image based on an additional bitstream and a feature according to another embodiment of the present disclosure.

FIG. 13 is a block diagram illustrating encoding/decoding of an input image based on an additional bitstream and a feature according to another embodiment of the present disclosure. The block diagram of FIG. 13 is a block diagram illustrating an apparatus for performing the second method.

Referring to FIG. 13, a feature extractor 1310 may receive an input image, extract a feature from the input image, and send the extracted feature to a feature encoder 1320 and an additional information encoder 1330. The feature encoder 1320 may encode the input feature. The encoded feature may be sent to the additional information encoder 1330. In addition, the feature encoded by the feature encoder 1320 may be included in a bitstream (e.g., VCM bitstream) and output. The additional information encoder 1330 may encode additional information using the encoded feature received from the feature encoder 1320 and the extracted feature received from the feature extractor 1310. The encoded additional information may be output as an additional bitstream.

An additional information decoder 1340 may receive an additional bitstream including the encoded additional information and decode the additional information. The feature decoder 1360 may receive a feature bitstream including the encoded feature and decode the feature. The input image reconstructor 1350 may reconstruct the input image using the decoded additional information received from the additional information decoder 1340 and the decoded feature received from the feature decoder 1360. The input image reconstructor 1350 may improve the quality of the image reconstructed based on the decoded feature by using the decoded additional information.

In the example shown in FIG. 13, the feature extractor 1310, the feature encoder 1320 and the additional information encoder 1330 may configure an image encoding apparatus for generating a VCM bitstream. In addition, the additional information decoder 1340, the input image reconstructor 1350 and the feature decoder 1360 may configure an image decoding apparatus for reconstructing a VCM bitstream.

Figure 14:
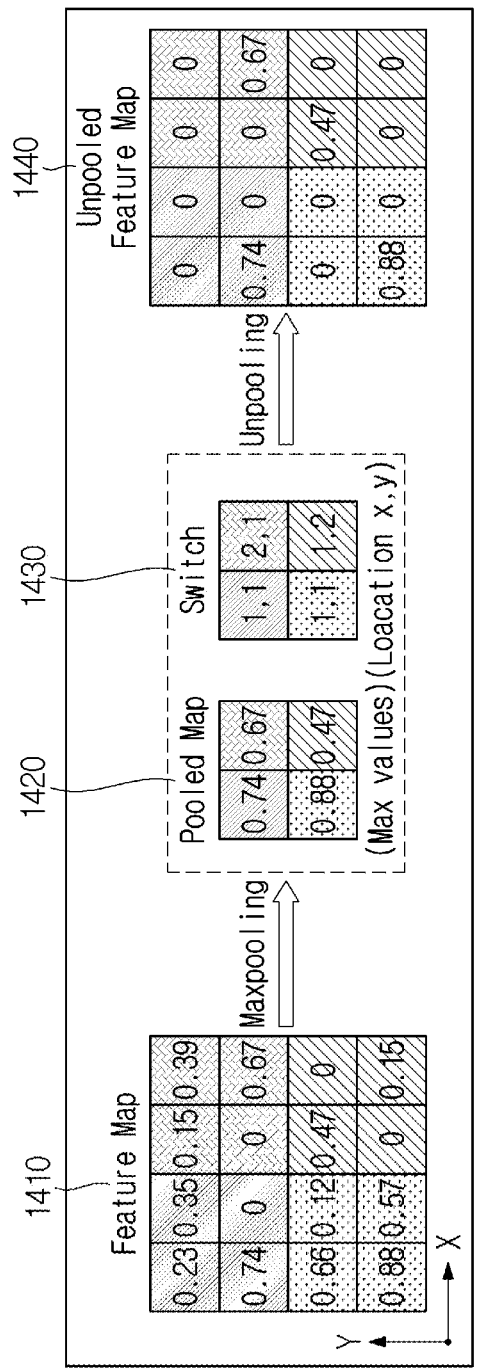
FIG. 14 is a diagram for explaining an example of additional information according to the present disclosure.

FIG. 14 is a diagram for explaining an example of additional information according to the present disclosure.

Additional information available in a max pooling and unpooling process will be described with reference to FIG. 14. The process of extracting the feature in FIG. 13 may correspond to convolution. In this case, the process of reconstructing the input image may correspond to deconvolution. Accordingly, reconstructing the input image based on the feature may be performed through deconvolution. Here, the additional bitstream may include additional information for increasing the accuracy and/or quality of deconvolution. For example, when max pooling is applied in the convolution process, a previous feature map may be reconstructed only when the locations of the largest values in each range in the feature map are known during unpooling. To this end, for example, location information of a value used for max pooling to improve quality in a feature-based image reconstruction process may be encoded into additional bitstream as additional information. Specifically, information (e.g., Pooling_Location_Flag) indicating the location of a value selected in max pooling may be signaled as additional information. In this case, information (e.g., Pooling_Location_list[layer[channel][x][y]]) indicating the location of a value selected in max pooling for each layer and/or channel location may be signaled. Location information of a value used for max pooling and/or information indicating the location of a value selected in max pooling for each layer and/or channel location may correspond to additional information included in the additional bitstream of FIG. 13.

Referring to FIG. 14, a maximum value within each quartered range in a feature map 1410 before max pooling may correspond to 0.74, 0.67, 0.88, and 0.47. The pooling map 1420 after max pooling may indicate a value used for map pooling. Also, a switch 1430 may indicate a location of a value used for max pooling. A feature map 1440 after unpooling may represent 0.74, 0.67, 0.88, and 0.47, which are maximum values within each quartered range, and all values not used for max pooling may represent 0.

As described with reference to FIG. 14, by encoding the location of a value used for max pooling into an additional bitstream as additional information, it is possible to obtain a reconstructed image having improved quality during unpooling.

Figure 15:
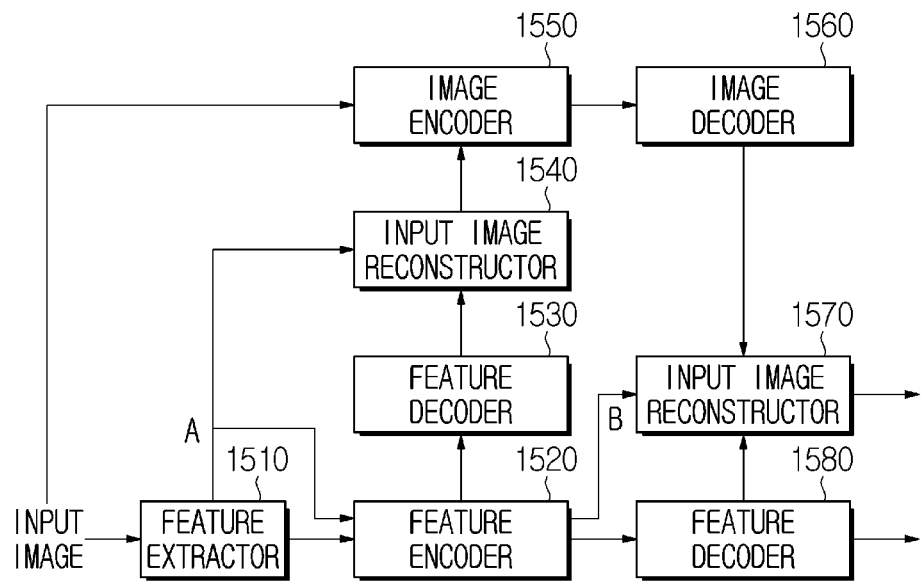
FIG. 15 is a diagram illustrating a max pooling and unpooling process according to the present disclosure.

FIG. 15 is a block diagram illustrating encoding/decoding of an input image based on an additional bitstream and a feature according to another embodiment of the present disclosure. The example shown in FIG. 15 may be applied to both the example of FIG. 12 and the example of FIG. 13. That is, the block diagram of FIG. 15 may be a block diagram of an apparatus for performing both the first method and the second method.

FIG. 15 shows a combination of encoding/decoding of the input image described with reference to FIG. 13 and the encoding/decoding of the input image described with reference to FIG. 12, and some blocks of the block diagram of FIG. 12 and the block diagram of FIG. 15 may be the same and overlap. In the block diagram of FIG. 12 and the block diagram of FIG. 15, a redundant description of the same or overlapping steps may be omitted. In addition, A and B shown in FIG. 15 may indicate additional information which may be used in the feature-based reconstruction process described with reference to FIGS. 13 and 14.

Referring to FIG. 15, a feature extractor 1510 may receive an input image and extract a feature from the input image. In addition, the feature extractor 1510 may obtain additional information A in a feature extraction process and send the obtained additional information to an input image reconstructor 1540. The feature extracted by and/or the additional information obtained by the feature extractor 1510 may be sent to a feature encoder 1520 and/or the input image reconstructor 1540. The input image reconstructor 1540 may reconstruct the input image using the feature and/or additional information. The feature encoder 1520 may encode the additional information and the feature, and output the encoded additional information (additional bitstream) B and the encoded feature (VCM bitstream).

An input image reconstructor 1570 may reconstruct the input image using the decoded input image received from the image decoder 1560 and the additional information reconstructed from the additional bitstream and/or the decoded feature received from the feature decoder 1560.

In the example shown in FIG. 15, the feature extractor 1510, the feature encoder 1520, the feature decoder 1530, the input image reconstructor 1540 and the image encoder 1550 may configure an image encoding apparatus for generating a VCM bitstream. In addition, the image decoder 1560, the input image reconstructor 1570 and the feature decoder 1580 may configure an image decoding apparatus for reconstructing a VCM bitstream.

In the example shown in FIG. 15, the additional information A is shown as being directly input from the feature extractor 1510 to the input image reconstructor 1540, but is not limited thereto. For example, in order for the input image reconstructor 1540 to use the additional information A to reconstruct the input image, the additional information A may be sent to the input image reconstructor 1540 through the feature encoder 1520 and/or the feature decoder 1530 or the additional information A may be sent to the input image reconstructor 1540 through another component.

Similarly, in the example shown in FIG. 15, the additional information B is shown as being directly input from the feature encoder 1520 to the input image reconstructor 1570, but is not limited thereto. For example, in order for the input image reconstructor 1570 to use the additional information B to reconstruct the input image, the additional information B may be sent to the input image reconstructor 1570 through the image decoder 1560 and/or the feature decoder 1580 or the additional information B may be sent to the input image reconstructor 1570 through another component.

Figure 16:
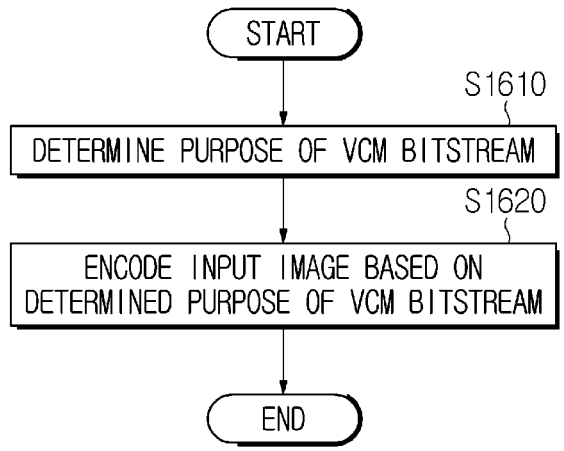
FIG. 16 is a flowchart illustrating an image encoding method according to an embodiment of the present disclosure.

FIG. 16 is a flowchart illustrating an image encoding method according to an embodiment of the present disclosure.

Referring to FIG. 16, the image encoding apparatus may determine the purpose of the VCM bitstream (S1610).

According to an embodiment, the purpose of the VCM bitstream may be determined based on information (e.g., Purpose_info) indicating the purpose of the VCM. When the purpose of the VCM includes both a machine task and a human task, the value of Purpose_info may be encoded into '11'. When the purpose of the VCM is a machine task, the purpose of the VCM bitstream may be determined to be a machine task. When the purpose of the VCM is a human task, the purpose of the VCM bitstream may be determined to be a human task.

According to another embodiment, information (e.g., Purpose_info_flag) indicating whether information indicating the purpose of the VCM bitstream is signaled may be signaled. For example, when the purpose of the VCM is a human task or a machine task, the value of Purpose_info_flag may be encoded into a second value (e.g., 0). For example, when the purpose of the VCM is a human task and a machine task, the value of Purpose_info_flag may be encoded into a first value (e.g., 1). Based on Purpose_info_flag, information (e.g., Human_task_flag and/or Machine_task_flag) indicating the purpose of the VCM bitstream may be signaled. When Purpose_info_flag has a first value (e.g., 1), Human_task_flag and/or Machine_task_flag may be signaled. When Purpose_info_flag has a second value (e.g., 0), Human_task_flag and/or Machine_task_flag, which is the information indicating the purpose of the VCM bitstream, may not be signaled.

In addition, the image encoding apparatus may encode the input image based on the determined purpose of the VCM bitstream (S1620).

According to an embodiment, when the purpose of the VCM bitstream is a human task, information (e.g., Human_consumption_bitstream_flag) indicating whether to use an additional bitstream may be signaled. When an additional bitstream for human consumption is used, information (e.g., Hybrid_coding_flag) indicating whether to use all additional bitstreams may be signaled. When the VCM bitstream is reconstructed using the additional bitstream and the feature information together, information (e.g., Coding_method) indicating one of a plurality of methods of decoding an image using the additional bitstream may be signaled.

According to another embodiment, Coding_method may indicate at least one of a first method of using feature information to decode the additional bitstream or the second method of improving the image generated by decoding the feature information based on the additional bitstream. For example, when Coding_method indicates the first method, a background area and a non-background area may be differently encoded based on the feature information. Alternatively, information on a reference feature of a picture to be encoded may be obtained and the picture to be encoded may be encoded based on the reference feature. For example, when Coding_method indicates the second method, Pooling_location_flag and/or Pooling_location_list[layer[channel][x][y] may be encoded in the additional bitstream.

In performing steps S1610 and/or step S1620 of FIG. 16, various embodiments according to the present disclosure may be applied.

Figure 17:
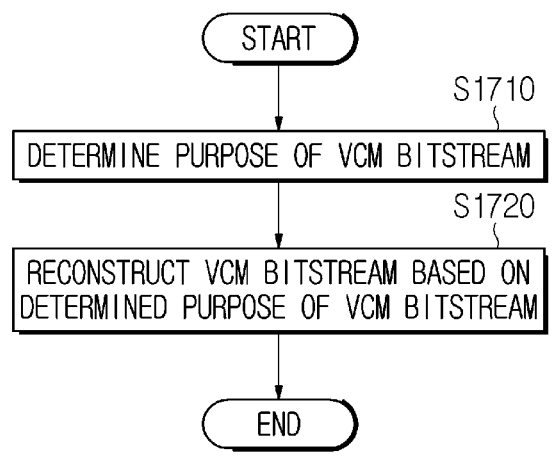
FIG. 17 is a flowchart illustrating an image decoding method according to an embodiment of the present disclosure.

FIG. 17 is a flowchart illustrating an image decoding method according to an embodiment of the present disclosure.

Referring to FIG. 17, the image decoding apparatus may determine the purpose of the VCM bitstream (S1710).

According to an embodiment, the purpose of the VCM bitstream may be obtained based on information (e.g., Purpose_info) indicating the purpose of the VCM. When the purpose of the VCM includes both a machine task and a huma task, the purpose of the VCM bitstream may be determined based on the information obtained from the VCM bitstream. The information obtained from the VCM bitstream may correspond to information (e.g., Human_task_flag and/or Machine_task_flag) indicating the purpose of the VCM bitstream. For example, when the purpose of the VCM is a machine task, the purpose of the VCM bitstream may be determined to be a machine task. For example, when the purpose of the VCM is a human task, the purpose of the VCM bitstream may be determined to be a human task.

According to another embodiment, in relation to determination of the purpose of the VCM bitstream, information (e.g., Purpose_info_flag) indicating whether information indicating the purpose of the VCM bitstream is signaled may be obtained. For example, when the information indicating the purpose of the VCM bitstream is signaled based on Purpose_info_flag, Human_task_flag and/or Machine_task_flag may be obtained. Based on Human_task_flag and/or Machine_task_flag, the purpose of the VCM bitstream may be determined. For example, when the information indicating the purpose of the VCM bitstream is not signaled based on Purpose_info_flag, the purpose of the VCM bitstream may correspond to a machine task or a human task.

In addition, the image decoding apparatus may reconstruct the VCM bitstream based on the determined purpose of the VCM bitstream (S1720).

According to an embodiment, when the purpose of the VCM bitstream is a human task, information (e.g., Human_consumption_bitstream_flag) indicating whether to use the additional bitstream may be obtained. For example, when the additional bitstream for human consumption is used, information (e.g., Hybrid_coding_flag) indicating whether all the additional bitstreams are used may be obtained. For example, when the VCM bitstream is reconstructed using the additional bitstream and the feature information together, information (e.g., Coding_method) indicating one of a plurality of methods of decoding an image using the additional bitstream may be obtained.

According to another embodiment, Coding_method may indicate at least one of a first method of using feature information to decode the additional bitstream or the second method of improving the image generated by decoding the feature information based on the additional bitstream. For example, when Coding_method indicates the first method, a background area and a non-background area may be differently decoded based on the feature information. Alternatively, information on a reference feature of a picture to be decoded may be obtained and the picture to be decoded may be decoded based on the reference feature. For example, when Coding_method indicates the second method, Pooling_location_flag and/or Pooling_location_list[layer[channel][x][y] may be obtained from the additional bitstream.

In performing steps S1710 and/or step S1720 of FIG. 17, various embodiments according to the present disclosure may be applied.

According to the embodiments described with reference to FIGS. 16 and 17, according to the image encoding and/or decoding method according to the present disclosure, when the purpose of the VCM is a human task or a machine task, whether the purpose of the VCM bitstream is a human task or a machine task may be determined. In addition, a structure for encoding/decoding a VCM bitstream for human consumption may be defined according to the image encoding and/or decoding method according to the present disclosure.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, in case it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an OTT video (over the top video) device, an Internet streaming service providing device, a three-dimensional (3D) video device, a virtual reality (VR) device, an augmented reality (AR) device, a video telephony video device, a transportation terminal (e.g., a vehicle terminal including an autonomous vehicle, a robot terminal, an airplane terminal, a ship terminal, etc.) and a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 18:
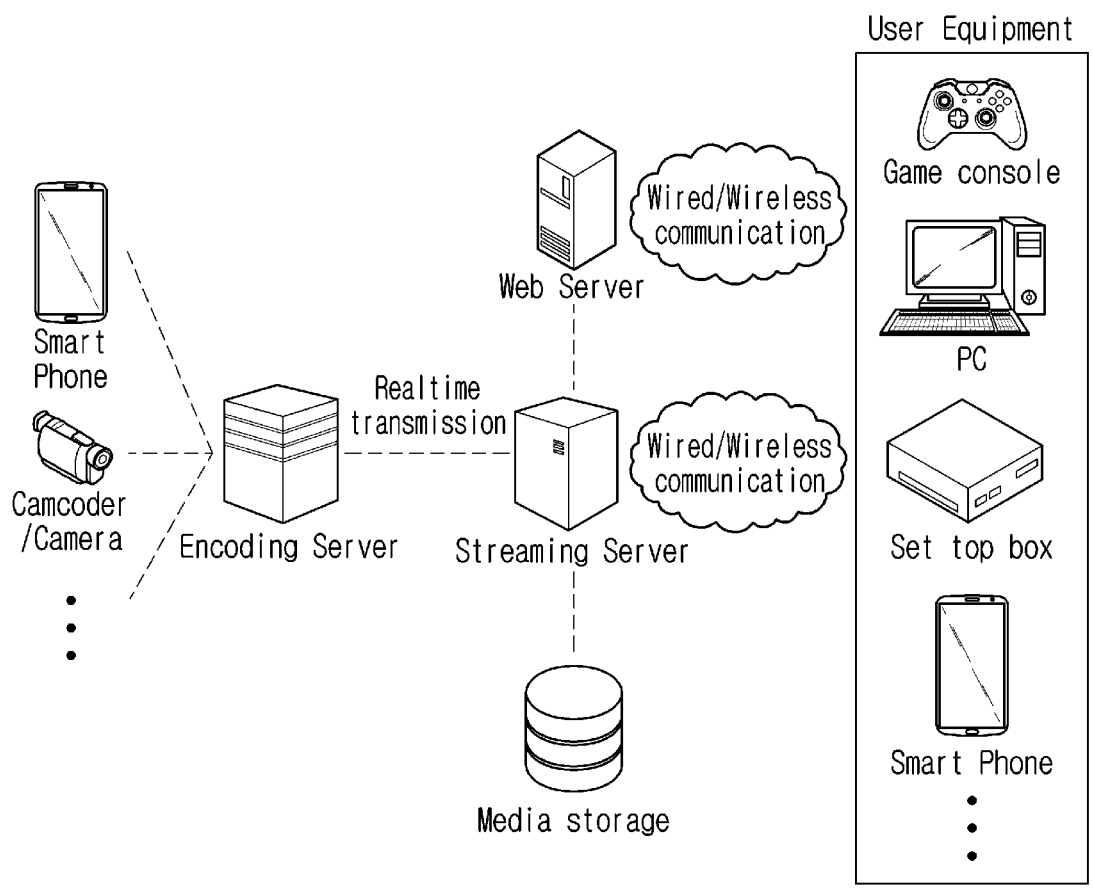
FIG. 18 is a view showing an example of a content streaming system, to which an embodiment of the present disclosure is applicable.

FIG. 18 is a view showing a content streaming system, to which an embodiment of the present disclosure is applicable.

As shown in FIG. 18, the content streaming system, to which the embodiment of the present disclosure is applied, may largely include an encoding server, a streaming server, a web server (interconnected system), a storage server (media storage), a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

Figure 19:
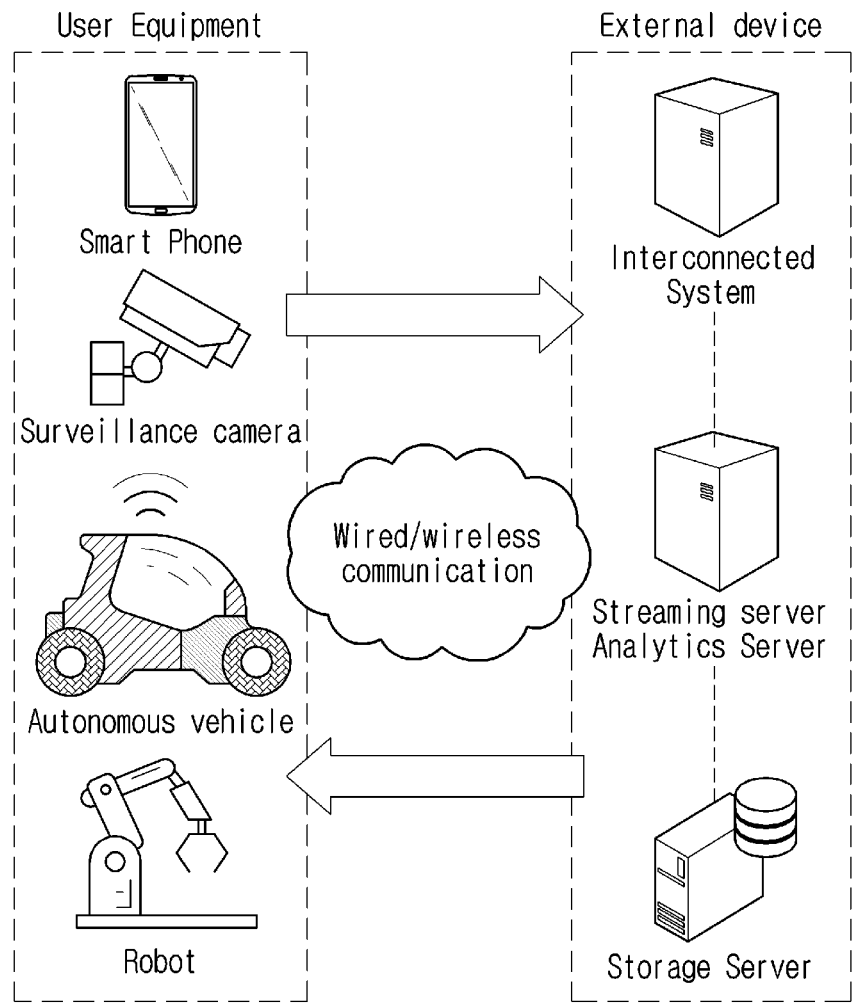
FIG. 19 is a diagram illustrating another example of a content streaming system to which an embodiment of the present disclosure is applied.

FIG. 19 is a diagram illustrating an embodiment of a content streaming system to which an embodiment of the present disclosure is applied.

Referring to FIG. 19, in an embodiment such as VCM, a task may be performed in a user terminal or a task may be performed in an external device (e.g., streaming server, analysis server, etc.) according to the performance of the device, the user's request, the characteristics of the task to be performed, etc. In this way, in order to transmit information necessary to perform a task to an external device, the user terminal may generate a bitstream including information necessary to perform the task (e.g., information such as task, neural network and/or usage) directly or through an encoding server.

In an embodiment, the analysis server may perform a task requested by the user terminal after decoding the encoded information received from the user terminal (or from the encoding server). At this time, the analysis server may transmit the result obtained through the task performance back to the user terminal or may transmit it to another linked service server (e.g., web server). For example, the analysis server may transmit a result obtained by performing a task of determining a fire to a fire-related server. In this case, the analysis server may include a separate control server. In this case, the control server may serve to control a command/response between each device associated with the analysis server and the server. In addition, the analysis server may request desired information from a web server based on a task to be performed by the user device and the task information that may be performed. When the analysis server requests a desired service from the web server, the web server transmits it to the analysis server, and the analysis server may transmit data to the user terminal. In this case, the control server of the content streaming system may serve to control a command/response between devices in the streaming system.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

The embodiments of the present disclosure may be used to encode or decode an image.

What is claimed is:

1. An image decoding method performed by an image decoding apparatus for reconstructing a VCM bitstream generated by video coding for machine (VCM), the image decoding method comprising:
   determining a purpose of the VCM bitstream; and
   reconstructing the VCM bitstream based on the determined purpose of the VCM bitstream,
   wherein the purpose of the VCM bitstream is determined based on first purpose information specifying one of a plurality of VCM purposes,
   wherein the plurality of VCM purposes includes a first VCM purpose with a human task, a second VCM purpose with a machine task, and a third VCM purpose with both the human task and the machine task,
   wherein based on the first purpose information specifying the third VCM purpose with both the machine task and the human task, the purpose of the VCM bitstream is determined based on second purpose information obtained from the VCM bitstream, and
   wherein the second purpose information specifies one of the human task and the machine task.

2. The image decoding method of claim 1, wherein the purpose of the VCM bitstream is determined to be the machine task based on the first purpose information specifying the second VCM purpose with the machine task.

3. The image decoding method of claim 1, wherein the purpose of the VCM bitstream is determined to be the human task based on the first purpose information specifying the first VCM purpose with the human task.

4. The image decoding method of claim 1, wherein the determining the purpose of the VCM bitstream comprising:
   obtaining flag information specifying whether information indicating the purpose of the VCM bitstream is signaled;
   obtaining information specifying the purpose of the VCM bitstream based on the flag information; and
   determining the purpose of the VCM bitstream based on the obtained information.

5. The image decoding method of claim 4, wherein, based on the information specifying the purpose of the VCM bitstream being not signaled, the purpose of the VCM bitstream is determined to be a predetermined purpose.

6. An image encoding method performed by an image encoding apparatus for encoding an input image of video coding for machine (VCM), the image encoding method comprising:
- determining a purpose of a VCM bitstream; and
- encoding the input image based on the determined purpose of the VCM bitstream,
- wherein the purpose of the VCM bitstream is determined as one of a plurality of VCM purposes,
- wherein the plurality of VCM purposes includes a first VCM purpose with a human task, a second VCM purpose with a machine task, and a third VCM purpose with both the human task and the machine task,
- wherein first purpose information specifying the one of the plurality of VCM purposes is encoded into the VCM bitstream, and
- wherein based on the first purpose information specifying the third VCM purpose with both the machine task and the human task, second purpose information specifying one of the human task and the machine task is encoded into the VCM bitstream.

7. A non-transitory computer-readable recording medium storing a bitstream generated according to an image encoding method, the image encoding method comprising:
- determining a purpose of a VCM bitstream; and
- encoding the input image based on the determined purpose of the VCM bitstream,
- wherein the purpose of the VCM bitstream is determined as one of a plurality of VCM purposes,
- wherein the plurality of VCM purposes includes a first VCM purpose with a human task, a second VCM purpose with a machine task, and a third VCM purpose with both the human task and the machine task,
- wherein first purpose information specifying the one of the plurality of VCM purposes is encoded into the VCM bitstream, and
- wherein based on the first purpose information specifying the third VCM purpose with both the machine task and the human task, second purpose information specifying one of the human task and the machine task is encoded into the VCM bitstream.

* * * * *